April 23, 1929.　　　M. J. HUGGINS　　　1,709,851
ELECTRIC CURRENT MEASURING INSTRUMENT
Filed Feb. 2, 1924
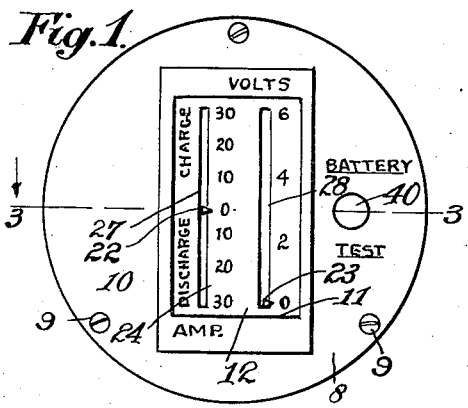
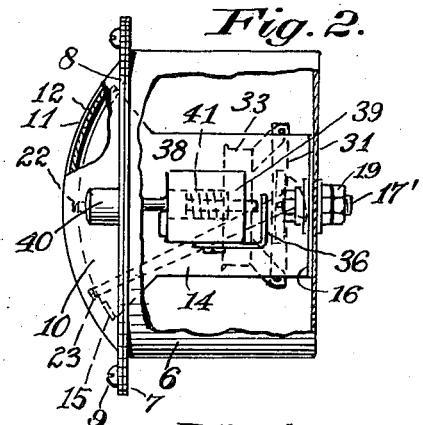
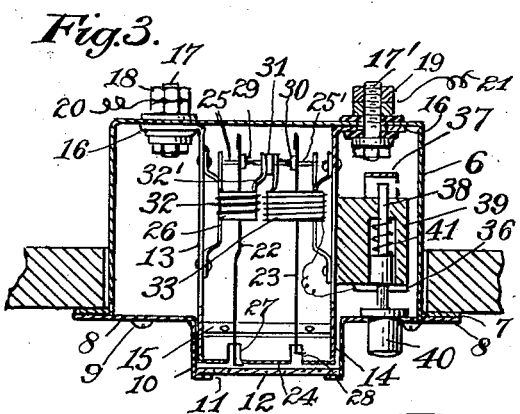
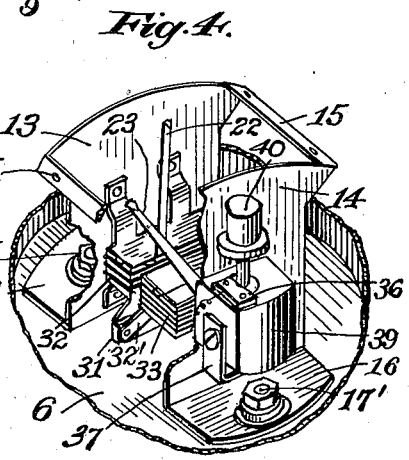
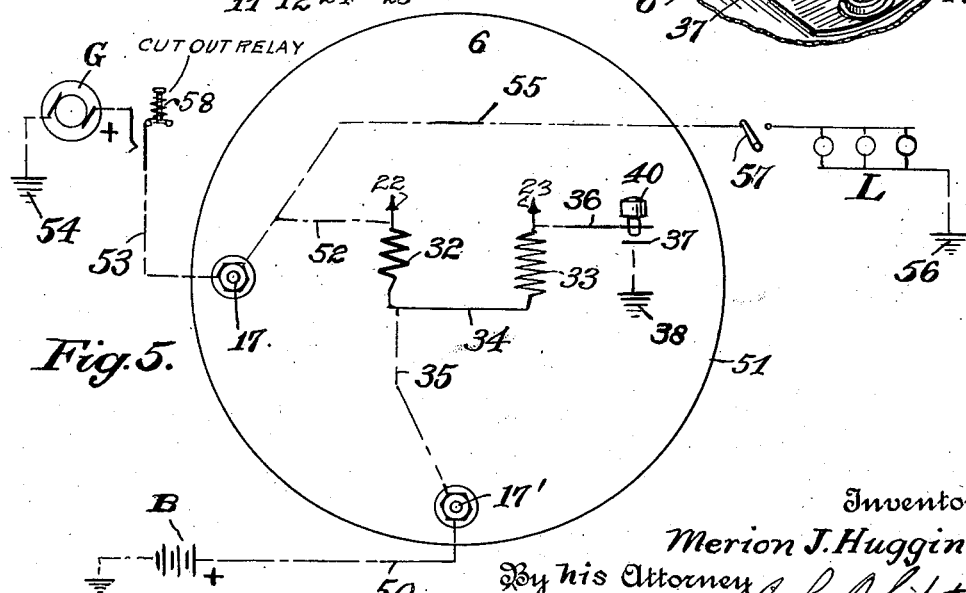
Inventor
Merion J. Huggins
By his Attorney Patented Apr. 23, 1929.

1,709,851

UNITED STATES PATENT OFFICE.

MERION J. HUGGINS, OF UPPER SADDLE RIVER, NEW JERSEY, ASSIGNOR TO AUTO-METER COMPANY, INC., OF NEW YORK, N. Y., A CORPORATION OF DELAWARE.

ELECTRIC-CURRENT-MEASURING INSTRUMENT.

Application filed February 2, 1924. Serial No. 690,175.

This invention relates to means for connection in circuit with a source of electricity to measure and indicate different conditions of an electric current, such as the strength and the electromotive force of an electric current or the amperage and voltage thereof, and it is the primary object of the invention to provide an instrument for this purpose of compact and unitary structure wherein the amperage of an electric current and the voltage thereof may be ascertained from a single instrument without the necessity of changing the electrical connection of the instrument in the circuit of the electric current the strength and motive force of which is to be ascertained, and to provide an instrument of this character which is novel, simple and cheap in structure and highly efficient in use.

It is a further object of the invention to provide an electric current measuring and indicating device of this character which is particularly adapted for use in connection with the electrical systems of motor vehicles with which it is electrically connected in circuit and arranged to be mounted upon a fixed part of the vehicle, such as the dash or instrument board where it may be readily observed by the driver of the vehicle.

A further object of the invention relates to the provision in instruments of this character of means to counteract and screen the instrument from external magnetic forces and thus prevent the distortion and derangement of the operative parts of the instrument by such external magnetic forces.

Other objects and advantages will hereinafter appear.

In the drawing accompanying and forming a part of this specification, Figure 1 is a front elevation of an electric current measuring and indicating device illustrating an embodiment of my invention.

Figure 2 is a side elevation with the enclosing casing for the operative mechanism partly broken away, to illustrate the manner of mounting the parts within the casing.

Figure 3 is a cross sectional view taken substantially on the line 3—3 of Figure 1 looking in the direction of the arrow.

Figure 4 is a perspective view of the operative parts of the instrument and showing the manner of supporting the same and the mounting thereof in its enclosing casing; and Figure 5 is a diagrammatic view to show the electrical connections between the different elements of the instrument.

Similar characters of reference designate like parts throughout the different views of the drawing.

In carrying out the embodiment of the invention shown in the drawing the operative parts are mounted in a casing or housing comprising a cup shaped member 6 having a laterally extended annular flange 7 at the rim which opening is closed by a disk or plate 8 secured thereto by screws 9 passing through openings in the peripheral portion of the closure plate and threaded into the casing flange 7. The closure plate has an outwardly bulged portion 10 arranged in the arc of a circle having an opening or window 11 therein closed by a transparent sheet 12 of glass or celluloid. By means of the flange 7 the casing may be mounted upon a fixed part, such as the dash or instrument board of a motor vehicle.

A mounting element or frame of magnetizable material, preferably of soft iron, in the nature of a magnetic shield to counteract and screen the instrument from derangement by external electric or magnetic forces, is mounted in the casing upon the back thereof, said bracket comprising a pair of parallelly extending members 13, 14 substantially of the form shown and connected in spaced relation by transverse members 15 integral therewith and adjacent the upper corners so as to leave a space between said members and the members 13, 14, the upper ends of the members 13, 14 being in an arc of a circle to coincide with the curvature of the bulged portion 10 of the closure plate, and the length of said members being such as to extend from the bottom of the casing adjacent to the curved wall of the bulged portion 10 of the closure plate and spaced apart to engage in the space between and lie contiguous to the side walls of said bulged portion. The opposite ends of the members 13, 14 are flanged outwardly, as at 16, to engage the back of the casing whereby the bracket is secured in position by threaded studs 17, 17' passing through openings in the flanges 16 and the back of the casing with nuts 18, 19 threaded thereon at the inside and outside of the casing thereby clamping the bracket in position, said studs and nuts being insulated from the bracket and casing when the latter is made of electric current conducting material, such as metal. The studs 17, 17' also serve as binding posts or contact terminals for connection of electric current conductors 20, 21 to connect the instrument in circuit with a source of electricity.

The indicating means comprises a pair of indicators or pointers 22, 23 and a dial 24, one of which is movable relative to the other, that is the pointers are movable and the dial fixed, or vice versa, the dial in the present instance being fixed at opposite ends to the transverse members 15 of the bracket to engage behind and be observed through the glass in the window of the bulged portion of the closure plate. The pointers in the present instance are mounted adjacent one end on pivot pins 25, 25' pivotally supported at the ends between ears or lugs of a carrier 26 of non-magnetizable material, such as brass, mounted on the side members 13, 14 of the bracket to engage within the latter, the opposite ends of the pointers extending through slots 27, 28 in the dial and the extremities bent laterally to extend over the front of the dial, as clearly shown in Figure 1, to move relative to graduations or calibrations arranged on the dial adjacent the slots. The dial adjacent the slot 27 is graduated for the use of the instrument as an ammeter for which purpose the dial is arranged with indices from zero to thirty reading in multiples of ten and reading from a zero position substantially midway between the ends of the slot towards the top and bottom of the dial, the reading of the dial up from the zero index indicating increase in amperage or charging as of a battery, and the dial may be arranged adjacent said indices with the index "charge", and the downward reading indicating decrease in amperage or discharge from the battery and may have arranged in relation thereto the index "discharge". The dial adjacent the slot 28 is graduated for use of the instrument as a volt meter, for which purpose it is arranged with indices reading from zero to six from the bottom to the top of the scale indicating voltage, it will be understood that this graduation may be arranged to indicate a greater voltage, the present arrangement being for illustrative purposes only. The abbreviation "amp." of "amperage" may be arranged at one end of the slot 27 to indicate that the measurement of the amperage of a current flow is to be read from said part of the dial, while at the end of the slot 28 at the opposite end of the dial the index "volts" may be arranged to indicate that the measurement of the electromotive force is to be read from said part of the dial. Each of the indicators or pointers 22, 23 has associated therewith at the pivotal support a magnetizable element in the form of a small flat polarized vane or plate 29, 30 said plates and thereby the pointers being normally maintained in predetermined positions by the permanent directive force of the magnetic field of a permanent bar magnet 31, said magnet being common to both of the magnetizable elements or vanes and being connected to and supported in interposed relation to said vanes by ears 32' of the carriers 26. The magnetizable elements are normally maintained by the permanent directive force of the magnet with the poles in parallel relation to the lines of force of the magnetic flux of the magnet and are so related to the pointers that the one pointer 22 will normally be positioned substantially midway between the ends of the dial slot 27 to register with the zero index while the other pointer will be normally maintained in position adjacent the lower end of the dial slot 28 in register with the zero index.

The indicator or pointer 22 is influenced by the strength of the electric current the amperage of which is to be ascertained by a coil 32 wound about a portion of the indicator carrier 26 to serve as a spool for said coil with one terminal of the coil electrically connected to the binding post 17 and the opposite terminal electrically connected to the binding post 17' and thereby connected in circuit with the electric current the condition of which is to be ascertained. The pointer 22 passing up through the coil and the magnetic field thereof any variations, increase or decrease, in the strength of the current flow will influence and move the pointer against the magnetic directive force of the permanent magnet upon the vane 29 associated with the pointer, such movement being proportional to the variations in the strength of the current flow and indicated by the pointer on the dial.

The indicator or pointer 23 is influenced by the electromotive force the voltage of which is to be ascertained by a coil 33 wound about a portion of the carrier 26 for the pointer 23 arranged to serve as a spool for said coil connected in a normally open circuit with the contact terminals 17, 17' and thereby with the source of current supply by connecting one terminal 34 of the coil in circuit with the conductor 35 of the coil 32, the other terminal of the coil 33 being connected to one member 36 of a contact maker the other member 37 of which is grounded in the casing, as shown in Figure 5. The contact making members 36, 37 are electrically connected by a stem 38 of conducting material slidably mounted in an insulator block 39 mounted on the member 14 of the mounting bracket and carried by a push button 40 slidably mounted in an opening in the closure plate for the casing normally urged outward with the flange on the button in engagement with said plate by a spring 41. The contact making member 37 is also carried by the insulator block 39. The pointer 23 is extended through the coil 33 and the magnetic field thereof. However, as no current is normally flowing through the coil the pointer under the magnetic and directive influence of the permanent magnet upon the vane 30 associated with said pointer will be positioned with the extremity adjacent the bottom of the dial slot 28. As the coil 33 is connected in the circuit the magnetic flux will be varied by and in accordance with the variations in the resistance of the coil to the electromotive force or voltage of the current, and as the coil is connected in circuit any variations, increase or decrease, in the electromotive force of the current will correspondingly increase or decrease the magnetic flux in which the pointer is located and will influence the pointer against the magnetic force of the permanent magnet upon the vane associated with said pointer 23 to move the pointer in the dial slot 28 a distance proportional to the variations in the electromotive force of the current and indicate the same on the dial. It will be obvious that as soon as the circuit for the coil 33 is again opened that the pointer will be returned to initial zero position under the permanent directive force of the magnet upon the magnetizable element associated with the pointer.

By the mounting of the indicator means, coils and magnet through the non-magnetizable carriers 26 upon the mounting element or bracket of magnetizable material the same will be practically enclosed by said bracket and the bracket serve as a shield to counteract any magnetic force external to the instrument and screen the parts from derangement by such exterior magnetic force.

In Figure 5 I have shown in a diagrammatic manner the electrical connections between the instrument and a source of electromotive force for use in connection with the electrical system of a motor vehicle, embodying a storage battery B having one terminal grounded, as in the frame of the vehicle, the other terminal being connected by a conductor 50 to the binding post 17' in the bottom of the instrument casing, which post is connected by conductor 35 with coil 32 and through the coil by conductor 52 with binding post 17, which is connected by a conductor 53 to one side of the generator shown in a general way at G, which is also grounded, as at 54, in the vehicle frame and thereby connected in circuit with the battery B. The lighting means, such as the head and tail lights, shown in a general way at L, is connected by a conductor 55 to the binding post 17 and grounded as at 56 and thereby connected in circuit with the battery and generator as well as the coil 32. The conductor 55 is arranged with a switch 57 to cut the lights into and out of circuit with the source of power. Assuming that the battery has a capacity of six volts and with no load the current will flow in one direction through the coil, assuming this to be in clockwise direction, and the resistance of the coil 32 to the current flow is such as to set up a magnetic field which will exert a magnetic force upon the polarized vane 29 of the pointer 22 to counterbalance the magnetic flux of the permanent magnet and thereby maintain the pointer in position to register with the zero index of the dial slot 27. As the motor of the vehicle is started and thereby the generator actuated the voltage of the battery is increased as well as the strength and amperage of the current and the flow of the current through the coil sets up an increased magnetic flux, this increase being proportional with the increase in the voltage, which acts upon the polarized vane 29 of the pointer 22 to deflect the same to a position with the poles of said vane out of parallelism with the magnetic lines of force of the permanent magnet and move the pointer relative to the scale to indicate charging or increse in amperage and the amount of this increase. As the lights, or other electric translating devices of the vehicle, are switched into the circuit of the source of power this will cause the current to be divided part of which flows through the circuit of the electric translating devices and part flows in reverse direction through the coil, and should this flow be of greater voltage than the battery voltage the flow of the lines of force in the magnetic field will be in the reverse direction reversing the polarity of the magnetizable element or vane associated with the pointer and exert an influence thereon to move the same and the pointer in a direction opposite to that above described and indicating any such increase in electric force in the current being indicated on the dial as battery charge and the rate of such charge.

To ascertain the voltage of the current the button is pushed inward thereby actuating the contact maker 36, 37 to close the circuit for the coil 33. Assuming that the capacity of the battery is six volts, should the battery be fully charged the resistance of the coil will set up a magnetic flux which will influence the magnetizable element or vane 30 of the pointer 23 to move the same against the influence of the permanent directive force of the permanent magnet and thereby move the pointer to a position to register with the index 6 at the top of the dial slot 28. Should there be any decrease in the voltage of the battery a proportional decrease in the resistance will be set up in the coil and a consequent weaker magnetic flux which will move the pointer a proportional distance in the dial slot to a position to indicate the voltage condition of the battery B.

A suitable relay, as shown at 58, is arranged in the connection of the generator with the contact terminal 17, said relay being operative to cut out the generator from the circuit when it is not in operation, and the electromotive force generated when the generator is started operating to close the circuit for the generator and connect the same in circuit with the battery.

While I have illustrated and described the invention as being particularly adapted for use in connection with the electrical system of a motor vehicle, the same may be utilized as an ammeter or voltmeter for testing batteries by applying the contact terminals 17, 17' of the instrument to the terminals of the battery, such application indicating the ampere condition of the battery, and by closing the circuit of the coil 33 the voltage condition will be indicated without any change in the contact terminals of the instrument relative to the terminals of the battery.

Having thus described my invention, I claim:

1. In an electric current flow indicating instrument, a casing, contact terminals carried by said casing for connection to a source of electricity, a conductor to electrically connect said terminals within the casing arranged with an indicator influencing coil intermediate its terminals, a second indicator influencing coil connected in a normally open circuit with said conductor, means to close the circuit of said second coil, and means within the casing to counteract and screen the instrument from influence by electrical forces external thereto.

2. In an electric current flow indicating instrument, a casing; a dial carried by the casing; a pair of indicators pivotally mounted in the casing to have movement relative to said dial; magnetic means to influence said indicators to move and maintain them in a predetermined position relative to the dial; contact terminals carried by the casing arranged for connection to a source of electricity; a coil in the casing electrically connected in a closed circuit with the contact terminals and adapted to electrically influence one indicator against the action of the magnetic means by and in accordance with variations in the electric current and indicate such variations on the dial; a second coil connected in a normally open circuit with the contact terminals, the second coil upon the closing of its circuit being adapted to electrically influence the other indicator to move the same against the action of the magnetic means relative to the dial to indicate another condition of the electric current; a pair of brackets of non-magnetizable material upon which the coils are wound and which carry the indicators; and a frame of magnetizable material upon which the indicator and coil carrying brackets are mounted, said frame being adapted to screen the instrument from derangement by external magnetic forces.

3. In an electric current flow indicating instrument, a casing; a dial carried by the casing; a pair of indicators movable relative to said dial; magnetic means to influence said indicators to move and maintain them in a predetermined position relative to the dial; contact terminals carried by the casing arranged for connection to a source of electricity; a coil in the casing electrically connected in a closed circuit with the contact terminals and adapted to electrically influence one indicator against the action of the magnetic means by and in accordance with variations in the electric current and indicate such variations on the dial; a second coil connected in a normally open circuit with the first coil, the second coil upon the closing of the circuit being adapted to electrically influence the other indicator to move the same against the action of the magnetic means relative to the dial to indicate another condition of the electric current; and means carrying said coils and indicators in the casing to electrically shield and screen said parts from external magnetism.

4. In an electric current flow indicating instrument, a casing; a dial carried by said casing adapted to be viewed through an opening in the casing and arranged with two sets of calibrations; a pair of pivoted pointers to co-operate with said dial calibrations, each pointer being arranged with a magnetizable element; a permanent magnet common to the magnetizable elements of both of said pointers and adapted to co-operate with the magnetizable elements associated with the pointers to move and normally maintain said pointers in a predetermined position relative to the dial calibrations; a coil connected in a closed circuit with a pair of contact terminals carried by the casing for connection in circuit with a source of electricity, said coil being adapted to electrically influence one of said pointers to move the same relative to one of the dial calibrations against the influence of the permanent magnet to indicate one condition of an electric current; a second coil connected in an open circuit with the contact terminals, said coil upon the closing of the circuit therefor electrically influencing the other pointer to move the same relative to the other dial calibration against the influence of the permanent magnet to indicate another condition of the electric current.

5. In an electric indicating instrument, a pair of independently pivotally supported indicators each having an armature associated therewith, a permanent magnet in the magnetic field of which the armatures are arranged to exert a directive force upon the armatures to independently urge the indicators to predetermined positions, a pair of independently supported magnetic force generating coils, each coil being arranged to act on an armature associated with an indicator to move the same independently of the other armature against the force of the permanent magnet.

6. In an electric current flow indicating instrument as claimed in claim 5, a magnetic shield to screen the instrument from magnetic forces external to the instrument.

7. In an electric current flow indicating instrument, a casing arranged with a dial, a pair of contact terminals carried by the casing arranged for connection with a source of electricity the current flow of which is to be ascertained, a permanent magnet, a pair of indicators mounted in the casing to have movement relative to the dial, an armature associated with each indicator arranged in the magnetic field of the magnet and the latter exerting a directive force thereon to move the indicators independently to predetermined positions relative to the dial, a pair of coils one of which coils is connected in closed circuit with the contact terminals and in the magnetic field of which the armature of one indicator is located to be influenced thereby to move the associated indicator against the directive force of the permanent magnet to indicate one condition of the current flow, the other coil being connected in open circuit with the contact terminals and the armature associated with the other indicator located in the magnetic field thereof to be influenced thereby to move the indicator when the circuit of the coil is closed against the directive force of the permanent magnet to indicate another condition of the current flow, and means carried by and operative from the exterior of the casing to close the circuit of said other coil.

8. In an electric current flow indicating instrument, a casing arranged with a dial having duplex calibrations, a pair of contact terminals carried by the casing adapted for connection with a source of electricity the current flow of which is to be ascertained, a pair of pointers having independent and coaxially arranged pivot supports in the casing and movable relative to the dial calibrations, an armature carried by each of said pointers, a permanent bar magnet fixedly supported in interposed relation to the armatures and adapted to exert a directive force upon the armatures to urge the pointers to predetermined positions relative to the dial, a coil connected in circuit with the terminals to influence the armature associated with one pointer to move said pointer relative to the dial against the directive force of the permanent magnet on said armature to indicate one condition of the current flow, a second coil connected in a normally open circuit with said contact terminals and adapted when the circuit thereof is closed to influence the armature associated with the other pointer to move said pointer relative to the dial against the directive force of the permanent magnet on said armature to indicate another condition of the current flow, and means carried by the casing operative from the exterior thereof to close the circuit of said second coil.

9. In an electric indicating instrument, a casing embodying a cupped member having a closure at the open end arranged with a sight opening, a bracket mounted in the casing, a dial arranged with duplex calibrations carried by the bracket for exposure through the sight opening in the casing closure, a pair of magnetic force generating coils, a carrier for each of said coils fixed to the bracket, each carrier arranged with a spool portion upon which a coil is wound and having parallelly extending lugs, an indicator pivotally mounted in the ears of each of the coil carriers to extend through the coil carrying spool portion thereof and movable relative to the dial calibrations, an armature associated with each indicator, a permanent bar magnet common to the armatures of both indicators and under the magnetic influence of which magnet thereon the indicators are urged to predetermined positions, and under the influence of the magnetic fields of the coils on said armatures the indicators are moved against the magnetic influence of the permanent magnet.

10. An electric indicating instrument as claimed in claim 9, wherein the bracket comprises a pair of side members whereby it is mounted upon the bottom of the casing and the dial is fixed to the opposite ends, said dial being arranged with a pair of parallel slots in relation to the calibrations, and the indicators being in the form of pointers extended through said dial slots for movement relative to the dial calibrations.

11. An electric indicating instrument as claimed in claim 9, wherein the bracket comprises a pair of side members mounted at one end upon the bottom of the casing to extend in parallel relation and the dial mounted on the opposite ends thereof, and an indicator and coil carrier mounted upon each of said side members with the indicator pivoting ears thereof extending in parallel relation toward the end of the side members of the bracket at which they are mounted in the casing.

Signed at the city of New York in the county of New York and State of New York this 23rd day of January, 1924.

MERION J. HUGGINS.